July 15, 1969    V. J. BURNS    3,455,172

ACCELERATION VECTOR CONTROL SYSTEM

Filed April 1, 1966    2 Sheets-Sheet 1

INVENTOR.
VERNON J. BURNS

INVENTOR.
VERNON J. BURNS

United States Patent Office 3,455,172
Patented July 15, 1969

3,455,172
ACCELERATION VECTOR CONTROL SYSTEM
Vernon J. Burns, Grand Rapids, Mich., assignor to
Lear Siegler, Inc.
Filed Apr. 1, 1966, Ser. No. 539,341
Int. Cl. G01c 19/44, 19/02
U.S. Cl. 74—5.34                                    15 Claims

ABSTRACT OF THE DISCLOSURE

The present invention provides a control system for eliminating and/or correcting vertical errors in the vertical gyro section of a gyroscopic platform. The system has longitudinal and lateral accelerometers which are stabilized in pitch and roll and mounted on the vertical gyro gimbals. Vehicle velocity signal inputs from an external source and heading inputs are supplied to the system. From these inputs, longitudinal and lateral accelerations are computed, and then subtracted from the outputs of the roll and pitch stabilized accelerometers to derive error signals. These error signals are used to torque the vertical gyro about the roll and pitch axes to null said error signals.

---

Figure 1:
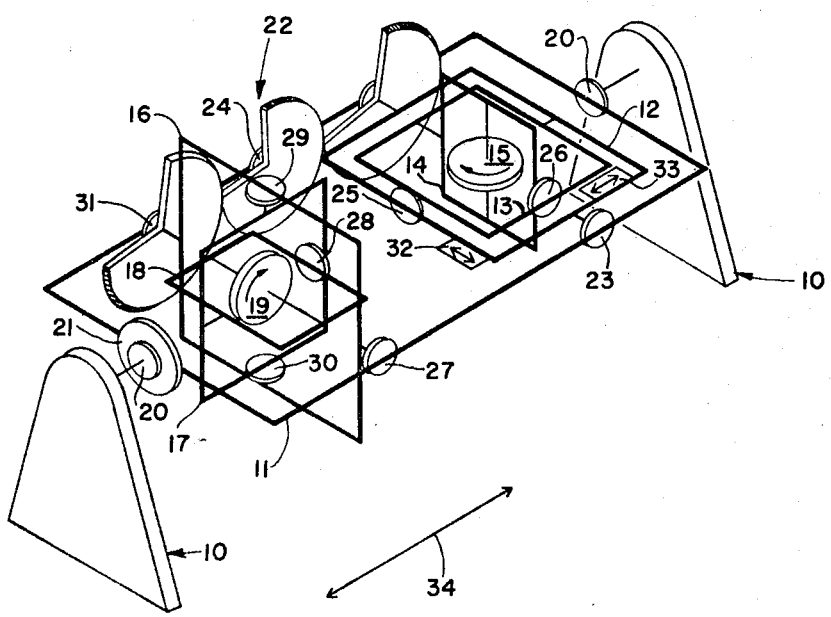

This invention relates to a control system for gyroscopic platforms and, more particularly, to an acceleration vector control system adapted to sense and correct deviations of the vertical gyro from the true vertical.

Almost all gyroscopic platform systems include a vertical gyro section. The purpose of this section is to make available within the aircraft or other type of vehicle a vertical reference to the center of the earth which is used in many different manners during travel and use of the vehicle. Basically, the vertical gyro is a two-degree-of-freedom unit having its stabilized reference line kept along the earth's vertical.

Unfortunately, it is not possible merely to position the stabilized reference line along the earth's vertical upon initiating use of the vehicle and thereafter rely upon the "fixed in space" characteristics of the gyroscope to maintain this orientation. The rotation of the earth, vehicle velocity with respect thereto (profile drift), random drift and instrumentation errors all contribute to necessitate a constant correction of the gyroscopic stabilized reference line in order to maintain it in coinciding relationship with the earth's vertical. A number of systems have been proposed heretofore for executing this correction. These systems have met with varying degrees of success depending upon the accuracy requirements of the particular vehicle, the expense justified in installing such a system and the customary maneuvers which the vehicle executes during use.

One of the first such systems which met with any degree of success was the so-called geocentric pendulum. Basically, this system derives from air data or doppler and aircraft turn rate mechanical torques internal to the unit which represent fore-aft and lateral accelerations respectively. These mechanical torques are physically subtracted from torques resulting from vehicle accelerations acting on a pendulous mass to achieve a degree of independence from the errors caused by vehicle fore-aft and lateral accelerations.

The damped multiple Schuler tuned system, another such system, employs two acceleration sensors which are gyro stabilized in roll, pitch and azimuth. The accelerations derived from these sensors are earth oriented (north and east for example). These accelerations are integrated to produce velocities which are compared with corresponding velocities derived from air data or doppler and heading information. An error or difference between the measured velocity and the integrated acceleration is injected into the control loop which changes the orientation of the accelerometers with respect to the vertical till such time as the above noted velocity difference is nulled. This system is basically a velocity comparator and computes in terms of earth coordinates.

Also currently available is the full Schuler tuned or so-called "pure" inertial system which comprises a plurality of conventional gyros, accelerometers, gimbals, servoes and other computing elements. In this system, accelerations are singly integrated and used to torque the gyro to maintain its vertical orientation and in order to eliminate acceleration errors due to gravity coupling. Accelerations are doubly integrated to obtain signals representative of distance traveled.

In installations utilizing the so-called geocentric pendulum, there are no signals available which represent acceleration for use in other areas of aircraft avionics. Added accelerometers are required for use in weapon delivery, terrain following, flight control and radar stabilization systems. Nor are any signals available which correspond to acceleration computed independently of the gyroscopic platform, such signals being very useful for the purpose of cutting off the correction system as a function of vehicle acceleration level. Computed acceleration, rather than accelerometer output, should be used to derive cut off signals of this type in order to avoid the possibility of large vertical error, and corresponding high accelerometer output, holding the system in an undesired cut off condition during periods when fore-aft and lateral vehicle accelerations are in reality at low levels. Perhaps a more important problem is the extreme difficulty encountered in packaging a roll and pitch stabilized pendulum in a mechanical configuration which is economically produced and yet not so bulky as to render it non-adaptable for direct mounting on the gyro gimbals. Thus, an extra set of gimbals and attendant slaving equipment are normally required. This, of course, results in further cost, bulk and unreliability. Finally, since this pendulum is a type of special purpose electromechanical computer, it is impossible to utilize recently developed electronic components and computing elements so as to increase accuracy and utility while reducing packaging problems. The present revolution in the electronics industry is tending to render devices of this type obsolete.

The damped Schuler tuned system requires accelerometers possessing extreme accuracy under relatively high acceleration conditions. Installations of this type require use of the entire accelerometer range (which is integrated for the earth profile torquing rate) for any vehicle maneuver. Such accelerometers are, of course, expensive to manufacture. Additionally, the damped Schuler tuned system has turn accelerations coupled first into the North-South accelerometer and then into the East-West accelerometer, with neither control loop operating near null for any appreciable percentage of time regardless of the particular type of maneuver being executed. Any North-South or East-West vertical error remains in the same control loop during the entire maneuver because both the accelerometers and the gyro torquing axes are azimuth stabilized. It is possible to incorporate a cut off mode to reduce the accuracy requirements of the accelerometers. In this case, cut off periods are very long (in a simple turn for example) requiring high precision and high cost in other system components to prevent unacceptable drift.

Angle of attack in the damped Schuler tuned system produces a resolution error of the external velocity input into the North-South and East-West components. This can be compensated for by adding the horizontal component of angle of attack to the heading prior to resolving the velocity. This process, however, necessitates additional equipment with consequent increases in cost and bulk. Like the geocentric pendulum, the damped Schuler tuned system has no external acceleration data available to determine when the various erection system loops should be cut off unless this data is generated specifically for this purpose with attendant increases in cost and bulkiness.

The full Schuler tuned system has obviated many of the disadvantages encountered in the utilization of the geocentric pendulum and the damped Schuler tuned system. It is, however, extremely expensive to fabricate, install and maintain and cannot be considered competitive in the vast majority of vehicles. It is similar to the damped Schuler tuned system in that it relies on integrations of acceleration components to derive error signals for torquing the vertical gyro and thus it requires accelerometers having extremely high full range accuracies.

It is an object of this invention to provide a vertical error correction system which may be produced and installed for a fraction of the cost of a full Schuler tuned system and, yet, which incorporates all of the vertical functions thereof at an accuracy level which is adequate for all but the most specialized types of vehicles.

More particularly, it is an object of this invention to provide a vertical correction system wherein component accuracy requirements are minimized by comparing first order quantities rather than second order quantities.

It is an object of this invention to provide a vertical correction system which integrally provides computed acceleration values which may be utilized to cut off the vertical gyro torquing systems when their associated acceleration factors exceed a predetermined level, thus eliminating the necessity of utilizing accelerometer outputs or pitch and roll angle outputs for this function.

It is an object of this invention to provide a vertical correction system which does not utilize the entire accelerometer range for most maneuvers, and thus which may embody accelerometers which are relatively inaccurate and inexpensive.

It is an object of this invention to provide a vertical correction system which separates the longitudinal control loop from the lateral control loop to enable nearly constant (null) operation of the former to usual vehicle maneuvers.

It is an object of this invention to provide a vertical correction system which is referenced to aircraft coordinates about the azimuth axis instead of being referenced to ground coordinates.

It is an object of this invention to provide a vertical control system wherein the cut off times are limited such that gyro drift rate and the precision of compensation torquing rates may be reduced by a factor of approximately 10 from that required in Schuler tuned systems, thus permitting the utilization of relatively inexpensive gyroscopic and torquing components.

It is an object of this invention to provide a vertical correction system embodying an inexpensive and convenient means of notifying the vehicle controller whenever a failure in the correction system or a system power failure has occurred and thus caused a present or impending gross error in the attitude information obtained from the reference system.

Figure 2:
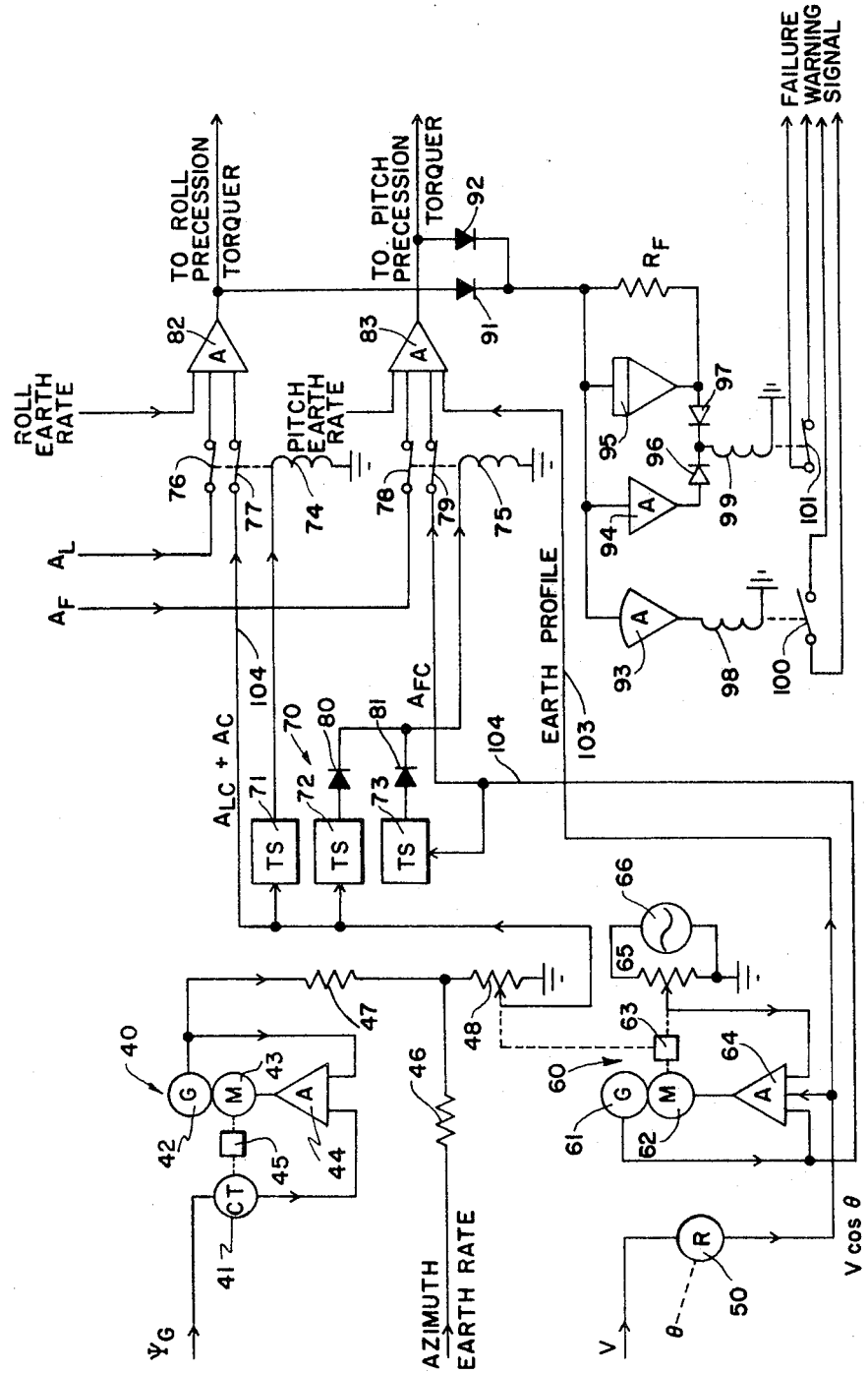

These and other objects of this invention will be clearly understood by reference to the following specification and accompanying drawings in which:

FIG. 1 is a stick diagram illustrating a typical gyroscopic platform in which the present invention may conveniently be incorporated and illustrating the positioning of the lateral and fore-aft accelerometers thereon; and FIG. 2 is a schematic diagram of a specialized computer circuit which may be utilized in the vertical correction system.

Briefly, this invention comprises a gyroscopic platform having a vertical gyro section. Mounted directly on the vertical gyro gimbals or on some gimbal configuration slaved thereto are longitudinal and lateral accelerometers. These accelerometers are roll and pitch, but not azimuth, stabilized, thus allowing azimuth references to be made with respect to aircraft coordinates instead of earth coordinates. The longitudinal accelerometer measures acceleration generally parallel to the projection on a horizontal plane of the vehicle's longitudinal axis and the gravity coupled acceleration present because of any deviation of the vertical gyro from the true vertical about the pitch axis. The lateral accelerometer measures acceleration parallel to the lateral axis of the vehicle and any gravity coupled acceleration present because of deviation of the vertical gyro from the true vertical about the roll axis.

Means are provided for detecting the velocity of the vehicle with respect to its environment and for determining the heading thereof. These velocity measurements may be derived from conventional air data, doppler or the like. From these measurements, the longitudinal and lateral accelerations of the vehicle are computed. These accelerations are then compared with the outputs of the roll and pitch stabilized longitudinal and lateral accelerometers respectively to derive error signals representative of the gravity coupled components of longitudinal and lateral misalignment of the vertical gyro. These error signals are utilized to torque the vertical gyro about the roll and pitch axes until such time as the error signals are nulled.

This invention further comprises means for constantly monitoring the computed accelerations and for cutting off the torquing systems during periods in which those signals exceed predetermined levels. The system additionally integrally embodies a warning system to advise the operator whenever one of the difference or error signals jumps to a relatively high value or whenever it remains moderately high for a considerable period of time, indicating a system malfunction. Means are provided further to warn the operator of power failure and thus of imminent system malfunction.

Referring now to the figures, a preferred embodiment of this invention will be described in detail.

FIG. 1 is a stick diagram of a gimbal platform having vertical and directional gyro sections. The frame 10 is affixed to the vehicle such that the arrow 34 corresponds with the longitudinal axis thereof. A common roll gimbal 11 is shared by the vertical and directional gyros. Suitably supported within common roll gimbal 11 in the vertical gyro section are a servoed pitch gimbal 12, an inner roll gimbal 13 and an inner pitch gimbal 14 in which the vertical gyro rotor 15 is mounted. The directional gyro section has a pitch servoed gimbal 16, an azimuth gimbal 17 and a leveling gimbal 18 within which directional gyro rotor 19 is mounted.

Conventional instrumentation is provided throughout the platform. By way of example, typical components may comprise a roll angle transmitter 20 and a roll angle torquer 21 between frame 10 and outer roll gimbal 11. A mechanical slaving system 22 maintains pitch gimbals 12 and 16 at the same relative attitudes. A pitch angle resolver 23 and a pitch gimbal torquer 24 operate in conjunction with mechanical slaving system 22. The vertical section additionally embodies an inner roll pickoff 25 and an inner pitch pickoff 26. The directional system is conventionally supplied with a pitch angle transmitter 27, an azimuth torquer 28, an azimuth angle transmitter 29, a leveling torquer 30 and a pitch angle transmitter 31.

The platform shown in FIG. 1 is merely representative of a wide variety of gyroscopic systems in which the present invention is adaptable for use. Once any particular platform or system of platforms has been decided upon, a lateral accelerometer 32 and a longitudinal accelerometer 33 are affixed thereto in such a manner that they are roll and pitch stabilized within the platform but not azimuth stabilized. That is to say, that the azimuth coordinates as regards accelerometers 32 and 33 will be aircraft coordinates as opposed to earth coordinates. Accelerometers 32 and 33 measure accelerations along the axes indicated by the arrows within their schematic notations.

In addition to acceleration sensing devices 32 and 33 the present system also requires some means for sensing the velocity and heading of the vehicle and for deriving the horizontal and lateral components thereof. These means may comprise, for example, air data or doppler and heading information from which may be derived longitudinal and lateral acceleration vectors. Necessary attitude angles may be taken directly from the gyro platform since subsequent derivations render the system self-closing in a convergent manner.

Referring now to FIG. 2, there is illustrated a representative circuit embodiment for performing the required mathematical and sensing operations on the data from the sensing devices. The circuit consists basically of a heading resolver or synchro and differentiation network 40, a resolver or synchro network 50, a velocity differentiation network 60, a threshold switching system 70, a pair of amplifiers 82 and 83 and a warning network 90.

The heading resolver and differentiation network consists of a conventional synchro receiver 41 which is coupled by means of a gear train 45 to a motor 43 and generator 42. An amplifier 44 having a feed back line from generator 42 drives motor 43. Suitable resistors 46 and 47 and a variable pot 48 are provided to complete this network.

The velocity differentiation network 60 comprises a rotary rate generator 61 and motor 62 which are coupled by means of a gear train 63 to potentiometers 48 and 65. Potentiometer 65 is excited by a suitable excitation source 66. An amplifier 64 is provided to drive motor 62. This amplifier is also connected by feedback loops to generator 61 and potentiometer 65 in a well-known manner.

The threshold switching system 70, which functions to cut off proper section of the vertical correction system when the longitudinal and/or lateral acceleration forces exceed certain predetermined limits, consists of three conventional threshold switching units 71, 72 and 73. Switches 72 and 73 are coupled by means of diodes 80 and 81 to a relay coil 75 having contacts 78 and 79. Threshold switch 71 is coupled to a relay coil having contacts 76 and 77. Suitable amplifiers 82 and 83 are provided for summing and/or amplifying the various signals to be discussed in detail hereinafter. The outputs of these amplifiers are constantly monitored by warning system 90 which consists of a pair of diodes 91 and 92, amplifiers 93 and 94, a voltage integrator 95 and a pair of diodes 96 and 97. The output of amplifier 93 operates a relay having a coil 98 and a switch 100 which is normally open. The output of amplifier 94 and integrator 95 operates a relay having a coil 99 and a contact 101 which is normally closed.

The specific circuitry illustrated in FIG. 2 is merely representative of a vast number of varying types of components and combinations thereof which may be utilized to perform the mathematical and sensing functions which form the basic concepts of this invention. For example, digital components could easily be utilized by merely converting the various inputs into digital form prior to their introduction into the various networks.

OPERATION

Vertical accuracy of the vertical gyro may be effected by any one or combination of a number of different phenomena. Basically, these phenomena consist of Coriolis acceleration, earth profile rate, earth rotation rate, and random component drift. The specific methods of correcting for the earth's rotation rate, Coriolis acceleration and the earth's profile rate are of no importance to this invention. In fact, the vertical correction system disclosed herein will function with some degree of accuracy in the absence of any specific correction for these phenomena. Overall accuracy will be improved, however, if computed signals of these known deviations are supplied as shown in FIG. 2, leaving the correction system subject to inaccuracies due only to minor computational errors and random instrument drifts. Signals corresponding to these deviations may be introduced into the circuitry at the points noted in FIG. 2.

The velocity (V) of the vehicle is constantly monitored and introduced into resolver 50 which resolves to yield approximately the horizontal component of it. Assuming, for example, that the vehicle in question is an aircraft and that it is flying at a pitch angle $\theta$, the output of resolver 50 constantly equals V cos $\theta$. That is to say, that the purpose of resolver 50 is to isolate the approximate horizontal component of vehicle velocity. The angle $\theta$ may be obtained from a source exterior to the gyroscopic platform or, alternatively, may be obtained directly from the pitch gimbal pickoff since the system is self-closing. The output of resolver 50 is utilized directly as a correction for earth profile and is routed to amplifier 83 for this purpose via line 103. The output of resolver 50 is additionally fed into velocity differentiation network 60 and merges therefrom via lines 104 as computed acceleration in the fore-aft or longitudinal direction. This longitudinal acceleration component will hereinafter be referred to as $A_{FC}$ and is also routed to amplifier 83.

The aircraft heading or gyro azimuth angle $\Psi G$ is constantly fed into heading resolver and differentiation network 40. This gyro azimuth angle is representative of heading relative to inertial space. It is not compensated for earth rate or meridian convergence. Network 40 resolves and differentiates this heading signal into computed acceleration in the lateral direction hereinafter referred to as $A_{LC}$. This quantity, along with the representative correction for Coriolis acceleration obtained by introducing the azimuth earth rate into network 40 and by virtue of the fact that azimuth earth rate is present (uncompensated) in $\Psi G$ is routed to amplifier 82 via line 104.

The output of accelerometer 32, which is the measured lateral acceleration from one of the roll and pitch stabilized gimbals is also fed into amplifier 82 along with a suitable correction for roll earth rate. The output $A_L$ of accelerometer 32 contains the following components:

(1) The acceleration along the lateral axis such as occurs during constant-speed, constant-altitude turn maneuvers of the aircraft, commonly referred to as "centripetal acceleration."

(2) The acceleration coupled in from the fore-aft axis as a result of angle-of-attack.

(3) The gravity coupled acceleration due to a vertical error angle about the roll axes of the gyroscopic platform.

The computed acceleration $A_{LC}$ is equal to that component of $A_L$ which is perpendicular to the true earth vertical. These two components are bucked out in amplifier 82. The fore-aft coupled acceleration is normally negligible since fore-aft accelerations during turns are small and the coupled amount is even smaller. They may therefore be safely ignored in most applications. The gravity coupling component of $A_L$, which is the remaining portion present in the difference signal emerging from amplifier 82, is indicative of the deviation of the gyroscopic platform from the true vertical about the roll axis and is utilized as a signal to the roll precession torquer to correct the vertical error about the roll axis. In addition to summing components $A_L$ and $A_{LC}$, amplifier 82 also transmits the Coriolis acceleration correction and the roll earth rate correction to the roll precession torquer.

The output from the platform mounted, roll and pitch stabilized longitudinal accelerometer $A_F$ is fed to amplifier 83. The output of accelerometer 33 also contains three primary components which are:

(1) The acceleration along the longitudinal axis, such as occurs when the speed of the vehicle is changed during straight and level maneuvers.
(2) The acceleration coupled in from the lateral axis which is the projection the centripetal acceleration during turn maneuvers on the longitudinal axis.
(3) The acceleration due to gravity coupled vertical error about the pitch axis of the accelerometer which is equal to 1g times the sine of the vertical error angle.

The computed acceleration $A_{FC}$, or rate of change of the horizontal component of aircraft velocity, is equal to the horizontal component of $A_F$ sensed by accelerometer 33 and is bucked out in amplifier 83. The centripetal coupled acceleration, while not precisely negligible, does not justify correction for a certain class of vehicular maneuvers. The gravity coupled component of $A_F$ which is what remains after the summing of $A_{FC}$ and $A_F$ is fed from amplifier 83 to the pitch precession torquer to precess the gyro pitch axis and thus correct the vertical error which resulted in the presence of the gravity coupled component. Suitable corrections for earth profile and pitch earth rate are also fed via amplifier 83 to the pitch precession torquer.

Thus it will be seen that the essence of this invention lies in isolating the gravity coupled acceleration components from the outputs of the roll and pitch stabilized longitudinal and lateral accelerometers and utilizing these signals to precess the vertical gyro about the roll or pitch axes until such time as these signals are nulled. The absence of these signals indicates that the gyro vertical is in such a position as to correspond closely if not exactly to the true earth vertical. This isolation is accomplished by comparing or summing the lateral acceleration sensed by accelerometer 32 with a computed lateral acceleration and by comparing the output of longitudinal acceleration sensed by accelerometer 33 with the rate of change of a computed or actual horizontal velocity component.

The computed lateral and longitudinal accelerations are constantly monitored by threshold switches 71, 72 and 73. Threshold switch 71 is coupled to relay 74 and, when actuated, opens switches 76 and 77 to remove both the measured and computed acceleration signals from amplifier 82 and thus cuts off the lateral section of the vertical correction system. Threshold switches 72 and 73 are coupled to relay coil 75 and, when activated, open contacts 78 and 79 to remove both the computed and sensed acceleration signals to amplifier 83 and thus cut off the longitudinal section of the vertical correction system. Conveniently, the level detectors may be set to operate approximately as follows:

$A_{LC}$ above 0.3g—open contacts 76 and 77
$A_{FC}$ above 0.3g—open contacts 78 and 79
$A_{LC}$ above 1.0g—open contacts 78 and 79

Accelerometer scale factor error and linearity error are of no importance above the cut off point and, therefore, the provision of threshold switches 71, 72 and 73 allows the utilization of markedly less expensive accelerometer components.

Since usually aircraft maneuvers are such that the lateral acceleration forces are much higher and more persistent than the longitudinal acceleration forces, the separation of the lateral and longitudinal control loops enables operation of the longitudinal control loop near null for a large percentage of the time. Assume, for example, that a damped Schuler tuned system is equipped with a derived acceleration computer. The percentage of time in cut off of such a system would be much greater than the present system. For a 1g turn (45 degree bank angle) each control loop of the damped Schuler tuned system is cut out 66.6 percent of the time for a 0.5g cut off level and 83.9 percent of the time for a 0.25g cut off level. In the present invention, the longitudinal control loop remains activated during the entire maneuver. Because of the greater time in cut off, the gyro drift rates and the precision of compensation torquing rates must be aproximately ten times better in the damped Schuler tuned system for the same vertical error as in the present system. Additionally, such a damped Schuler tuned system would in all likelihood require a frequency-controlled power source for the gyro motors and some type of very accurate gyro torquers. The present invention obviates the necessity for equipment of this type.

This invention also incorporates a warning system whereby the vehicle operator will be warned in the event that one of the difference signals jumps to a relatively high value, remains moderately high for a considerable period of time or a power failure occurs in the system. In the event that the difference signals jump to relatively high values or remain moderately high for a considerable period of time, level detector or amplifier 94 and feedback coupled integrator 95 will cause relay coil 99 to close switch 101. Suitable means may be coupled to this switch for notifying the pilot of the system malfunction.

In the event that power should be discontinued to the system, amplifier 93, which normally activates coil 98 to hold relay contact 100 in the closed position, will cease functioning, contact 100 will open, and a suitable warning device will alert the operator to this fact. Amplifier 93 may easily be designed such that it will maintain contact 100 in closed position regardless of the presence of a difference signal across diodes 91 and 92. Most circuits of this type normally have enough quadrature, harmonic and/or noise voltages present during normal, power on operation to hold the relay in pulled-in condition.

Thus it will be seen that this invention has provided a vertical correction concept which may be implemented in relatively simple and inexpensive fashion to insure that the vertical gyro axis in a stabilized platform will be maintained at almost all occasions in corresponding relationship to the true vertical. While a preferred embodiment of this invention concept has been set forth in detail, it will be readily apparent to those skilled in the art that many other embodiments may be readily designed which are capable of carrying forth the concepts set forth herein. Such embodiments are to be deemed as included in the following claims unless these claims, by their language, expressly state otherwise.

I claim:

1. A compensated vertical gyroscopic system for a moving vehicle comprising: a gyroscopic platform having a vertical gyro section; longitudinal measuring means pitch stabilized by said vertical gyro for measuring acceleration generally parallel to the vehicle longitudinal axis and for measuring gravity coupled acceleration present because of deviation of said vertical gyro from the true vertical about the pitch axis; means for computing the horizontal component of said vehicles velocity and deriving the longitudinal acceleration therefrom.

2. The apparatus as set forth in claim 1 wherein said longitudinal measuring means is restricted for rotation with said vehicle about the azimuth axis.

3. The apparatus as set forth in claim 1 which further comprises: lateral measuring means roll stabilized by said vertical gyro for measuring acceleration parallel to the projection of the lateral axis of said vehicle on a horizontal plane and for measuring gravity coupled acceleration present because of deviation of said vertical gyro from the true vertical about the roll axis; means for detecting said vehicles heading and velocity and deriving the lateral acceleration therefrom; second means for comparing said derived lateral acceleration with the output from said lateral measuring means to derive a roll error signal; and means for torquing said vertical gyro to produce angular rates about the roll axis so as to diminish said roll error signal.

4. The apparatus as set forth in claim 3 wherein said lateral measuring means is restricted for rotation with said vehicle about the azimuth axis.

5. The apparatus as set forth in claim 3 wherein both said lateral and longitudinal measuring means are pitch and roll stabilized by said vertical gyro and are fixed to rotate about the azimuth axis with said vehicle.

6. The apparatus as set forth in claim 5 which further comprises means for disconnecting said second comparing means from said roll torquing means whenever said comparing means from said roll torquing means whenever said derived lateral acceleration exceeds a predetermined limit.

7. The apparatus as set forth in claim 5 which further comprises means for disconnecting said first comparing means from said pitch torquing means whenever said derived longitudinal acceleration exceeds a predetermined limit.

8. The apparatus as set forth in claim 6 which further comprises means for disconnecting said first comparing means from said pitch torquing means whenever said derived longitudinal acceleration exceeds a predetermined limit.

9. The apparatus as set forth in claim 5 which further comprises: means for constantly monitoring said pitch and roll error signals to determine their instantaneous values; means for integrating said pitch and error signals to obtain a measure of the average value thereof; a warning device; and, means for activating said warning device in the event that the instantaneous values of said pitch and error signals exceeds a predetermined limit or in the event that the average value of said error signals over a predetermined time interval exceed a predetermined limit.

10. The apparatus as set forth in claim 9 which further comprises means for activating said warning device in the event that power to the system is interrupted.

11. A compensated vertical gyroscopic system for a moving vehicle comprising: a gyroscopic platform having a vertical gyro section; lateral measuring means roll stabilized by said vertical gyro for measuring acceleration parallel to the lateral axis of said vehicle and for measuring gravity coupled acceleration present because of deviation of said vertical gyro from the true vertical about the roll axis; means for computing the horizontal component of said vehicles heading and velocity and deriving the lateral acceleration component thereof.

12. The apparatus as set forth in claim 1 which further comprises means for comparing said derived longitudinal acceleration with the output from said longitudinal measuring means to derive a pitch error signal.

13. The apparatus as set forth in claim 12 which further comprises means for torquing said vertical gyro to produce angular rates about the pitch axis so as to diminish said pitch error signal.

14. The apparatus as set forth in claim 11 which further comprises means for comparing said derived lateral acceleration component with the output from said lateral measuring means to derive a roll error signal.

15. The apparatus as set forth in claim 14 which further comprises means for torquing said vertical gyro about the roll axis so as to diminish said roll error signal.

References Cited
UNITED STATES PATENTS 3,193,216    7/1965    Fischel _____ 74—5.8 XR C. J. HUSAR, Primary Examiner U.S. Cl. X.R.

74—5.8